US010366145B2

(12) United States Patent
Geraghty et al.

(10) Patent No.: US 10,366,145 B2
(45) Date of Patent: Jul. 30, 2019

(54) SYNDICATION OF SLIDESHOW CONTENT THROUGH A WEB FEED

(71) Applicant: Oath Inc., Dulles, VA (US)

(72) Inventors: Colm M. Geraghty, Co. Westmeath (IE); Cliff Redmond, Dublin (IE)

(73) Assignee: Oath Inc., Dulles, VA (US)

( * ) Notice: Subject to any disclaimer, the term of this patent is extended or adjusted under 35 U.S.C. 154(b) by 72 days.

(21) Appl. No.: 15/384,757

(22) Filed: Dec. 20, 2016

(65) Prior Publication Data

US 2017/0103051 A1 Apr. 13, 2017

Related U.S. Application Data

(63) Continuation of application No. 14/163,172, filed on Jan. 24, 2014, now Pat. No. 9,557,898.

(51) Int. Cl.

| | |
|---|---|
| *G06F 3/0481* | (2013.01) |
| *G06F 17/22* | (2006.01) |
| *G06F 3/0484* | (2013.01) |
| *G06F 17/21* | (2006.01) |
| *G06F 3/0485* | (2013.01) |
| *G06F 17/27* | (2006.01) |
| *G06T 11/60* | (2006.01) |

(52) U.S. Cl.
CPC ........ *G06F 17/2247* (2013.01); *G06F 3/0484* (2013.01); *G06F 3/0485* (2013.01); *G06F 17/211* (2013.01); *G06F 17/212* (2013.01); *G06F 17/2765* (2013.01); *G06T 11/60* (2013.01)

(58) Field of Classification Search
CPC .................................................... G06F 3/0481
See application file for complete search history.

(56) References Cited

U.S. PATENT DOCUMENTS

| | | |
|---|---|---|
| 8,117,546 B2 | 2/2012 | Chang |
| 2010/0293105 A1 | 11/2010 | Blinn et al. |
| 2011/0119571 A1 | 5/2011 | Decker et al. |
| 2011/0145698 A1 | 6/2011 | Penov et al. |

*Primary Examiner* — Matthew Ell
(74) *Attorney, Agent, or Firm* — Bookoff McAndrews, PLLC

(57) ABSTRACT

Systems and methods are provided for syndicating slideshow content in a web feed. Data is obtained for a content feed associated with a web page in response to a request by a user of a content feed reader. A slideshow within the web page is identified based on analysis of the obtained data according to a schema definition for syndication of slideshow content. A first set of properties for the slideshow is extracted from the obtained data, based on the schema definition. A set of slides of the slideshow is identified based on the first set of properties. A second set of properties for the set of slides is also extracted from the obtained data. The content feed including the set of slides of the slideshow and one or more properties of the second set are displayed to the user via the content feed reader.

17 Claims, 7 Drawing Sheets

SYNDICATION OF SLIDESHOW CONTENT THROUGH A WEB FEED

CROSS-REFERENCE TO RELATED APPLICATION

This application is a continuation of and claims the benefit of priority to pending U.S. application Ser. No. 14/163,172, filed Jan. 24, 2014, which is incorporated herein by reference in its entirety.

TECHNICAL FIELD

The present disclosure relates generally to enabling the syndication of electronic, online, and/or web content, and particularly, to enabling the syndication of multimedia content items of a website through a web feed.

BACKGROUND

Advancements in computing and network technologies now enable users to browse different websites for information on various topics of interest, from almost any location using a web browser installed at a mobile or personal computing device of each user. Users generally are interested in browsing a number of different websites, whose having content that may change frequently and/or on a continuous basis. Examples of such websites include, but are not limited to, news sites, information pages related to a public or private organization, commercial product pages, financial market websites, and weblogs. However, users may find the amount of information available across many websites at any given time too overwhelming. Users may also find it difficult to stay current with the latest content changes publications or updates made to each site. While it may be possible for users to repeatedly check each website for any new content, this can be a very tedious and time-consuming process. Also, while some websites may provide an option to send electronic mail (e.g., e-mail) or other notifications of content updates, such notifications from multiple websites also may become overwhelming, e.g., as the number and frequency of content updates for each site increases.

To enable users to access the latest content from multiple websites in a relatively faster and more efficient way, a content provider or owner/operator of a website may publish the website's content as a syndicated feed (or "web feed"), to which other websites (or web services) and/or end users of the website may subscribe for viewing the content via a feed reader or aggregator program executable at the services' or users' respective devices. The content provider or website operator may utilize specialized software, such as a content management system, for publishing recent content (or articles) to the web feed in a standardized format that is also understood by feed reader programs.

Conventional content syndication formats, such as the Really Simple Syndication (RSS) format, provide a basic specification for representing different content items and metadata (e.g., title, body, category, author, publication date, etc.) related to each item included within an article published on a website. A published website article may include various types of content including, but not limited to, text, images, audio, video, and other types of digital multimedia content. As conventional syndication formats for web feeds generally are generally used to provide a summary or a simplified version of the full articles and content items published on a website, such conventional formats may not include support for all of the types of content items that may be included within a published article on a website.

For example, the standard specifications of conventional web feed formats generally fail to provide support for slideshow content associated with an article. Therefore, such standard specifications may not provide a way for content distributors or website operators to associate a slideshow or any related slideshow metadata with a corresponding website article. Consequently, users of feed reader or aggregator programs may not be able to view the full version of an article including a slideshow.

While some markup languages, such as HTML5, may provide options to include figures and captions for supporting a list of images or other types of multimedia content, the use of such a markup language may limit the types of content or data that can be represented for a slideshow or any individual slide. Further, such a markup language generally does not support the types of metadata that may be required for each content item, especially, for example, slideshows.

SUMMARY OF THE DISCLOSURE

Embodiments disclose systems and methods for syndicating slideshow content in a web feed.

According to certain embodiments, computer-implemented methods are disclosed for syndicating slideshow content in a web feed. In an exemplary method, data is obtained for a content feed associated with a web page in response to a request initiated by a user via an interface of a content feed reader executable at a computing device of the user. A slideshow included within the web page is identified based on analysis of the obtained data according to a schema definition for syndication of slideshow content of web pages. A first set of properties for the identified slideshow is extracted from the obtained data, based on the schema definition. A set of slides of the slideshow is identified based on one or more properties of the first set of properties extracted for the identified slideshow. A second set of properties including a property of each of one or more slides in the identified set of slides is also extracted, based on the schema definition. The content feed including the set of slides of the slideshow along with one or more properties of the extracted second set of properties is displayed to the user via the content feed reader. The content feed is displayed based on at least one property of the extracted first set of properties of the slideshow.

According to certain embodiments, systems are disclosed for syndicating slideshow content in a web feed. One system includes a memory having processor-readable instructions stored therein; and a processor configured to access the memory and execute the processor-readable instructions, which when executed by the processor configures the processor to perform a plurality of functions, including functions to: obtain data for a content feed associated with a web page in response to a request initiated by a user via an interface of a content feed reader executable at a computing device of the user; identify a slideshow included within the web page based on analysis of the obtained data according to a schema definition for syndication of slideshow content of web pages; extract a first set of properties for the identified slideshow from the obtained data, based on the schema definition; identify a set of slides of the slideshow based on one or more properties of the first set of properties extracted for the slideshow; extract, from the obtained data, a second set of properties including a property of each of one or more slides in the identified set of slides, based on the schema definition; and display, to the user via the content feed reader, the content feed including the set of slides of the slideshow along with one or more properties of the extracted second set of properties, based on at least one property of the extracted first set of properties of the slideshow.

According to certain embodiments, a computer readable medium is disclosed as storing instructions that, when executed by a computer, cause the computer to perform functions to: obtain data for a content feed associated with a web page in response to a request initiated by a user via an interface of a content feed reader executable at a computing device of the user; identify a slideshow included within the web page based on analysis of the obtained data according to a schema definition for syndication of slideshow content of web pages; extract a first set of properties for the identified slideshow from the obtained data, based on the schema definition; identify a set of slides of the slideshow based on one or more properties of the first set of properties extracted for the slideshow; extract, from the obtained data, a second set of properties including a property of each of one or more slides in the identified set of slides, based on the schema definition; and display, to the user via the content feed reader, the content feed including the set of slides of the slideshow along with one or more properties of the extracted second set of properties, based on at least one property of the extracted first set of properties of the slideshow.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1A:
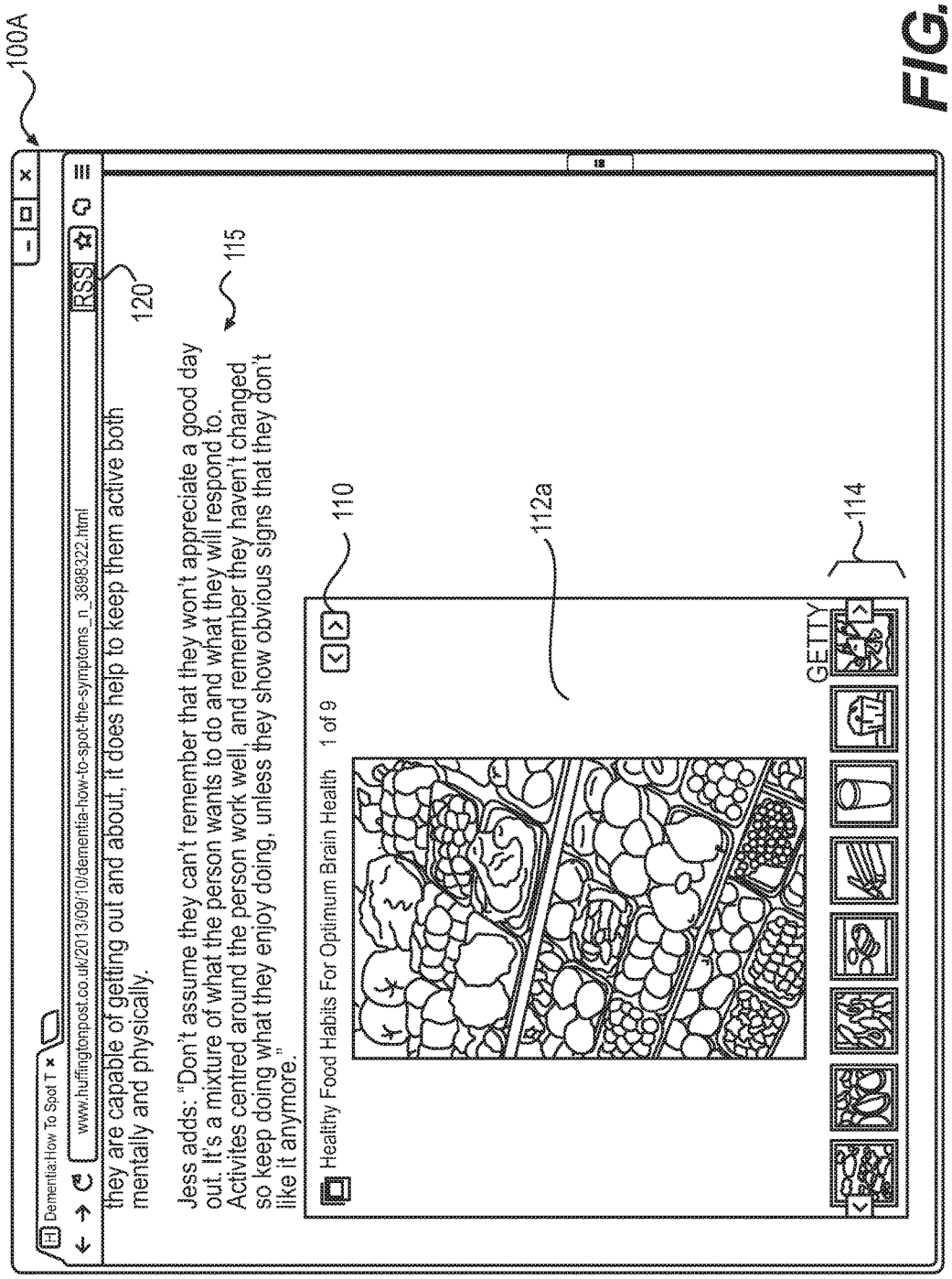
FIGS. 1A and 1B illustrate different views of an exemplary graphical user interface of a web browser displaying a web page with an article including a slideshow.

The present disclosure is directed to overcoming one or more of the above referenced issues. Specifically, the present disclosure is directed to enabling the syndication of slideshow content through web feeds and providing the syndicated slideshow content from a web feed to a user of a feed reader or aggregator program. The slideshow content may include, for example, one or more photographic and/or video slideshows embedded within an article published on a web page. The web page may be part of a website associated with one or more content providers. The article on the web page may include different types of content published by an owner or operator of the website. Examples of such content types include, but are not limited to, text, audio, images, videos, and any combination thereof, e.g., a combination of text and images included within different slides of a slideshow.

As conventional techniques for syndicating website content through a web feed fail to provide support for including slideshows as part of the content from a web page or article published to the feed, the present disclosure may be used to extend existing feed specifications for associating slideshows with the other types of content published to a feed for syndication by other websites or feed reader programs. In particular, embodiments of the present disclosure allow an owner or operator of a website to syndicate the website's content including a representation of the slideshow that preserves any metadata associated with the slideshow itself and/or with the individual slides of the slideshow. For example, according to certain embodiments, the systems and methods disclosed herein may involve syndicating one or more slideshows containing photographic and/or video content. The syndicated content may be made available via a web feed or channel to which third-party content providers (or third-party content management systems) or the website's end users may subscribe. A third-party content provider may publish the content from the web feed to a website operated by the provider. An end user subscribing to the web feed may view the feed's content through a feed reader or aggregator program executable at the user's computing device.

The terms "feed reader" and "aggregator" are used interchangeably herein to refer to any type of software program or application executable at a computing device of a user for purposes of displaying syndicated content received through one or more web feeds. The syndicated content transmitted to the user via a web feed may be frequently updated content from a particular website of interest, e.g., a news site, weblog, etc. In some implementations, a feed reader may be a plug-in extension or web-based utility integrated with a web browser executable at the user's computing device including, for example, a desktop computer or a mobile computing device (e.g., a smartphone or tablet device). Alternatively, the feed reader may be a standalone application program dedicated for to providing web-feed-related functionality, including presenting content and data for one or more web feeds to which the user has subscribed, e.g., via a graphical user interface (GUI). Users may subscribe to feeds either by entering a feed's universal resource locator (URL) or universal resource identifier (URI) into the reader or by clicking on a feed icon displayed within the user's web browser, e.g., depending on the particular implementation of the reader at the user's device. The feed reader may check the user-subscribed feeds periodically, e.g., based on a default or user setting, for new information or content updates. The feed reader may provide an option that the user may enable to allow the reader to automatically download any new or updated content for a web feed.

In an embodiment, the syndicated content may be published to the web feed in a standardized format, e.g., as defined by a specification written in extensible markup language (XML). Examples of such an XML-based syndication format include, but are not limited to, the Really Simple Syndication (RSS) format and the Atom Syndication Format (or "Atom"). While the examples provided below will be described using RSS, it should be noted that the present disclosure is not intended to be limited thereto and that the examples and embodiments disclosed herein may be adapted for web feeds formatted according to Atom or any other syndication format for web feeds or channels. It should also be noted that, for purposes of content syndication and/or feed aggregation, embodiments of the present disclosure may use XML in combination with Hypertext Markup Language (HTML), JavaScript, and/or any other web-based markup, scripting, or programming languages.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

It should also be appreciated that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Reference will now be made in detail to the exemplary embodiments of the disclosure, examples of which are illustrated in the accompanying drawings. Wherever possible, the same reference numbers will be used throughout the drawings to refer to the same or like parts.

Figure 1B:
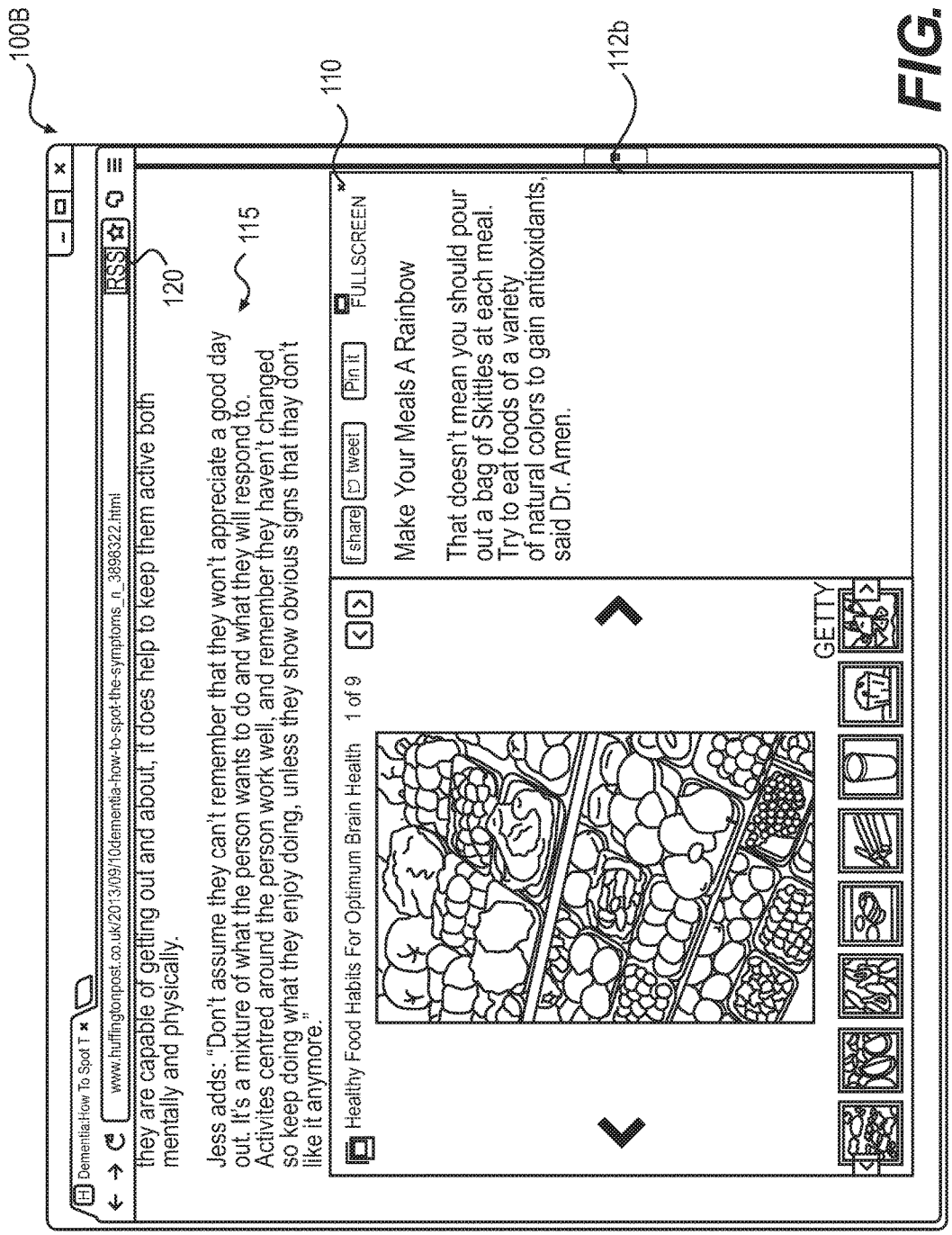

FIGS. 1A and 1B illustrate different views of an exemplary GUI of a web browser displaying a web page or article including a slideshow 112a, which may be embedded within a section 115 including the text of the article. It should be noted that such a text section 115 may include any number of slideshows (not shown) in addition to slideshow 112a. In the example shown in FIG. 1A, slideshow 112a includes a number of slides (e.g., a total of nine slides). However, it should be noted that the present disclosure might be used for syndicating slideshows having any number of slides. As shown in FIG. 1A, slideshow 112a includes a thumbnail viewer 114. A main slide viewing area may be used to display the individual slides of slideshow 112a, and thumbnail viewer 114 may be used to display a thumbnail preview of each slide. The set of slides associated with slideshow 112a may be from the same source (e.g., an owner or operator of the website) or any number of different sources (e.g., various third-party content providers that are not directly affiliated with the website). Since the source of each slide may be different from the website operator, proper attribution to the source of each slide may be displayed along with the slide in the main slide viewing area of slideshow 112a (e.g., a bottom portion above thumbnail viewer 114, shown in this case as being "Getty").

Also, as shown in FIG. 1A, slideshow 112a may include different user interface elements 110, such as navigation controls, for navigating in a forward or backward direction between successive slides in the series of slides of slideshow 112a. The user in this example may also choose to view a desired slide within slideshow 112a by selecting the corresponding thumbnail preview of the particular slide directly within thumbnail viewer 114.

In a further example, the user may be able to select an option to view an expanded version of slideshow 112a, as shown by slideshow 112b of FIG. 1B. As shown in the example of FIG. 1B, a view 100B of the web browser's GUI includes a slideshow 112b, which is a version of slideshow 112a that has been expanded to display additional elements associated with the current slide being displayed within the viewer. Such elements may include, for example and without limitation, additional user interface controls and/or additional text, e.g., a title and a description, related to the current slide. In an embodiment, the title, description, and other elements shown within slideshow 112b may reflect various items of metadata associated with slideshow 112b. Such items may be represented using different elements or attributes within an XML file corresponding to the web page and its contents, as will be described in further detail below.

In an embodiment, slideshow 112a or 112b (collectively referred to hereinafter as "slideshow 112a/b") and other content of the web page or related website in which the slideshow 112a/b is included may be syndicated by the owner or provider of the content or website itself. The syndicated content including slideshow 112a/b may be available via a web feed to a user of a feed reader or aggregator program, as described above. In an embodiment, a slideshow extension for an existing web feed format (e.g., RSS) may be provided to enable the content provider to make slideshow 112a/b along with the other website content available for transmission via a web feed (e.g., RSS feed). As will be described in further detail below, such a slideshow extension may also allow various metadata fields or a set of properties to be associated with slideshow 112a/b as it is transmitted. Further, this extension may allow metadata fields and/or a set of properties to be associated with each slide within slideshow 112a/b.

While slideshow 112a/b in the examples shown in FIGS. 1A and 1B include slides of different images, it should be noted that the techniques described herein are not intended to be limited thereto and that these techniques may be used for slideshows including slides having any of various types of content including, but not limited to, text, audio, video, graphics, and any combination thereof. Further, it should be noted that these techniques are not intended to be limited to the type of controls depicted for slideshow 112a/b in FIGS. 1A and 1B. For example, thumbnail viewer 114 may be an optional control element for slideshow 112a/b, and slideshow 112a/b may include any number of additional control elements, as desired for a particular implementation.

Figure 2:
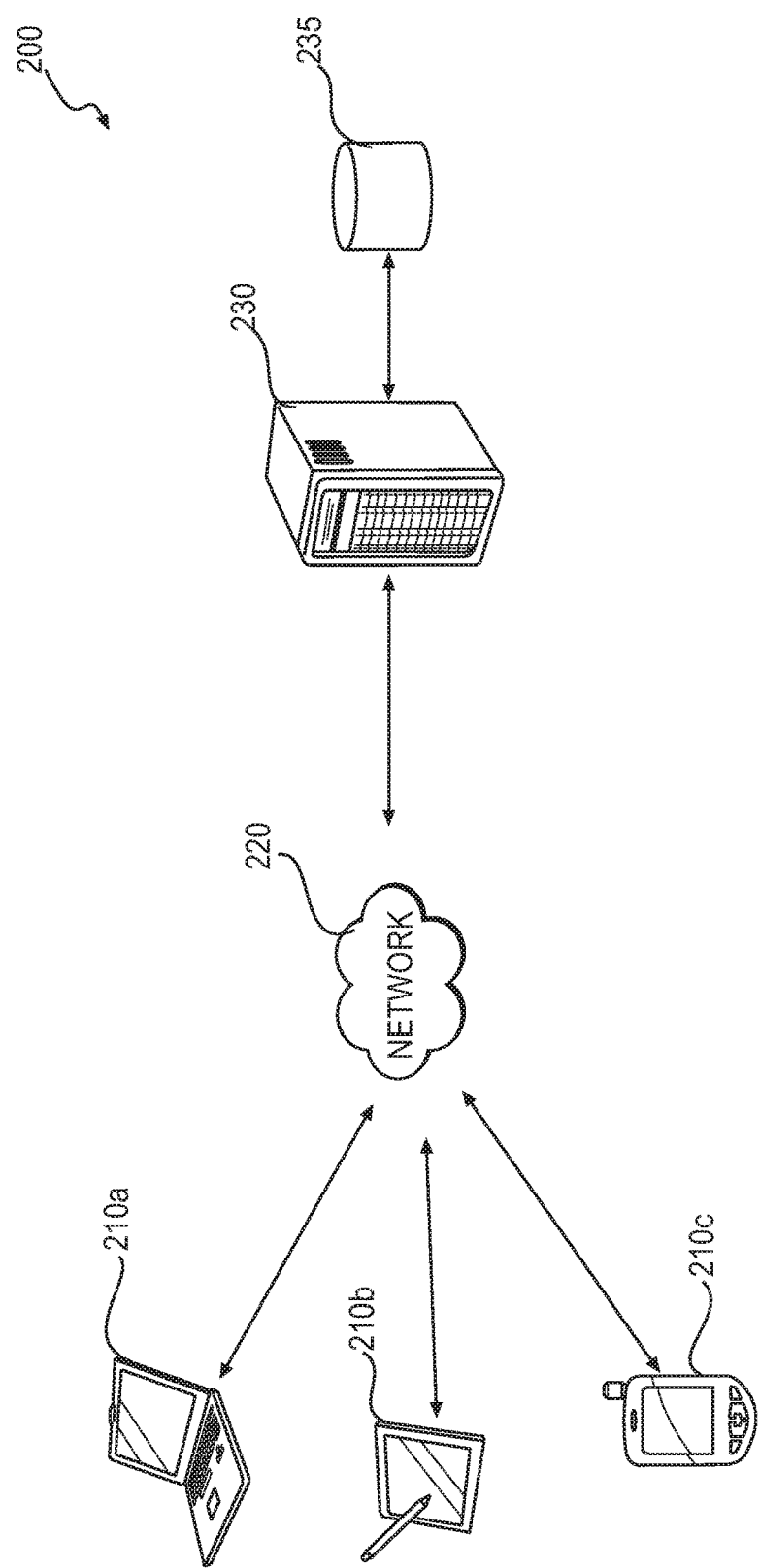
FIG. 2 is a block diagram of an exemplary communication system suitable for practicing embodiments of the present disclosure.

FIG. 2 is a block diagram of an exemplary communication system 200 suitable for practicing embodiments of the present disclosure. As shown in FIG. 2, system 200 includes user devices 210a, 210b, and 210c, a server 230, a data store or database 235, all of which may be communicatively coupled via an electronic network 220. Network 220 may be any type of electronic network or combination of networks used for exchanging electronic information between various computing devices. Network 220 may include, for example, a local area network, a medium area network, or a wide area network, such as the Internet. While only mobile devices 210a, 210b and 210c are shown in FIG. 2, system 200 may include any number of user devices (e.g., each associated with one of many hundreds, thousands, or millions of users), all of which may be communicatively coupled via network 220. Likewise, while only server 230 and database 235 are shown in FIG. 2, system 200 may include any number of servers and/or databases or data storage devices, as desired for a particular implementation.

Each of user devices 210a, 210b, and 210c may be any type of computing device configured to send and receive different types of content and data to and from various computing devices via network 220. Examples of such content and data include, but are not limited to, text, multimedia content (including images, video, and/or audio files), and slideshow content and data associated with one or more websites. Such content and data may be loaded and displayed within a web browser or other application executable at each of user devices 210a, 210b, and 210c. In an embodiment, the content and data may be transmitted via a web feed for display in a feed reader or aggregator program. In some implementations, the feed reader may be part of a web browser executable at each device. Alternatively, the feed reader may be implemented as a standalone application program executable at each device.

Examples of different types of computing devices that may be used to implement any of user devices 210a, 210b, and 210c include, but are not limited to, a desktop computer or workstation, a laptop computer, a mobile handset, a personal digital assistant (PDA), a cellular telephone, a network appliance, a camera, a smart phone, an enhanced general packet radio service (EGPRS) mobile phone, a media player, a navigation device, a game console, a set-top box, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

In the example shown in FIG. 2, user device 210a may be, for example, a laptop or similar type of mobile personal computer, mobile device 210b may be, for example, a tablet computer or similar type of mobile computing device having a touchscreen display, and mobile device 210c may be, for example, a mobile handset, smartphone, PDA, or similar type of device. However, it should be noted that user devices 210a, 210b, and 210c are not intended to be limited to the types of computing devices depicted in FIG. 2.

Server 230 may be implemented using any of various types of servers including, for example and without limitation, a web server or an application server. However, it should be noted that server 230 may be implemented using any general-purpose computer capable of serving data to other computing devices including, but not limited to, user devices 210a, 210b, 210c or any other computing device (not shown) via network 220. Thus, server 230 may be implemented using any computing device having at least one processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware may also include an output device, e.g., a display device coupled thereto, for displaying relevant information to a user and a user input device, e.g., a mouse, keyboard, or touchscreen display, for receiving input from the user.

In some embodiments, server 230 may be implemented using multiple servers or general purpose computing devices, e.g., having multiple processors and multiple shared or separate memory components within a clustered computing environment or server farm. Thus, while not shown in FIG. 2, server 230 may be implemented using multiple servers (e.g., in a server farm), which may be communicatively coupled to each other via network 220 or a private network behind a firewall (not shown). Furthermore, server 230 may be communicatively coupled to one or more databases or data storage devices (not shown) in addition to database 235. Such a data storage device may be used to store any type of data or content accessible by server 230. The data or content stored within database 235 may include, for example and without limitation, content related to different web pages of a website. A full or summarized version of the content may be stored in a format for a web feed (e.g., as an RSS feed or document) published in conjunction with the website. The web feed may be provided by server 230 via network 220 to other servers (not shown) related to third-party websites, content distributors, and/or end users of a feed reader, as described above. In an example, a third-party content distributor or website may provide a feed aggregation service for providing user access to content from multiple user-subscribed feeds associated with many different websites. Content updates for the multiple feeds may be periodically retrieved, combined, and presented to the user in a single location (e.g., a web portal page).

In an example, content from the website may be transformed by server 230 into a format or representation compatible with a feed reader, e.g., executable at each of user devices 210a, 210b, and 210c. In some implementations, the content or web feed may be in the form of an RSS feed or document provided to each of user devices 210a, 210b, and 210c via network 220. However, as noted previously, the techniques disclosed herein are not intended to be limited to RSS feeds, and these techniques may be applied to other types of content syndication formats including, but not limited to, the Atom syndication format.

Figure 3:
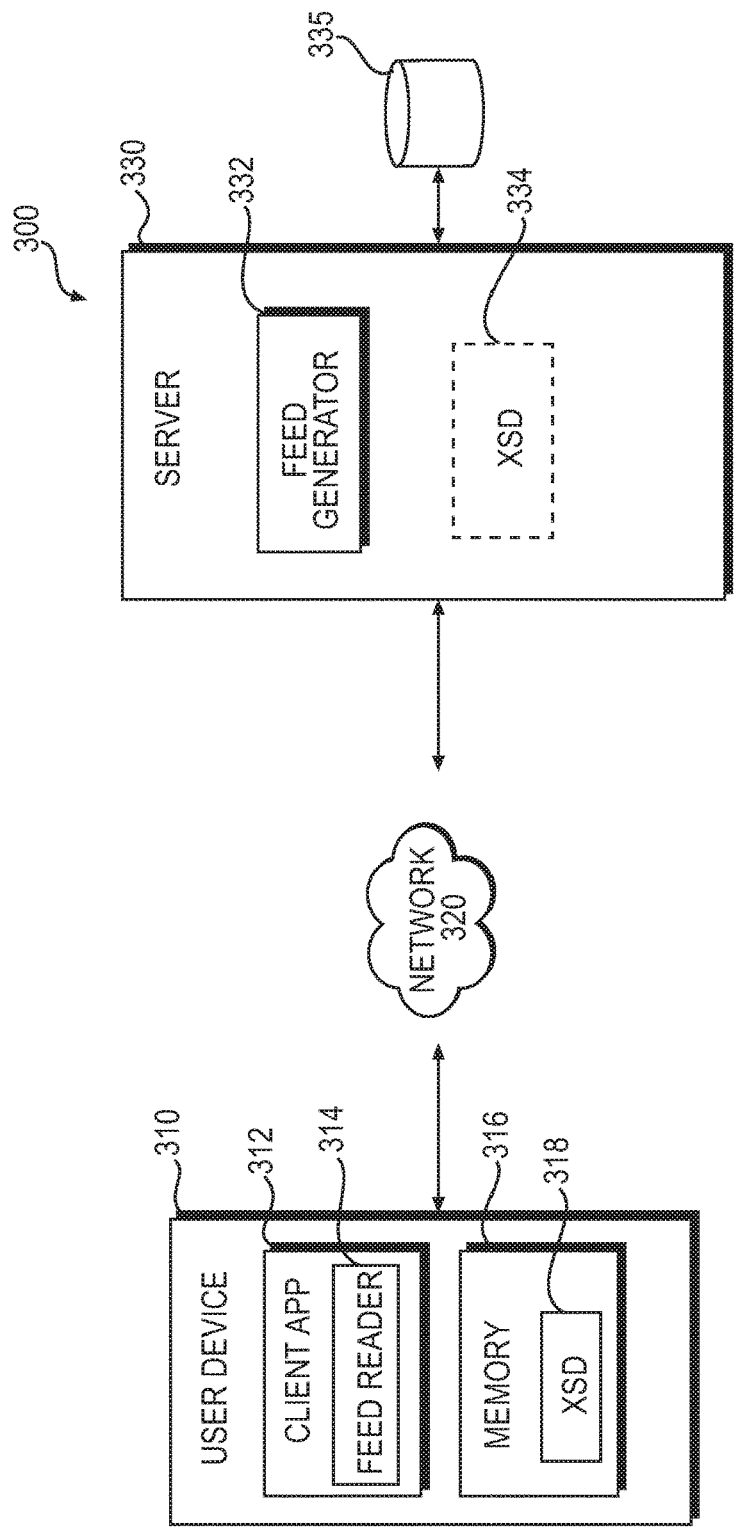
FIG. 3 is a block diagram of an exemplary communication system for providing syndicated slideshow content from a web feed to a user of a feed reader.

FIG. 3 is a block diagram of an exemplary communication system 300 suitable for practicing an embodiment of the present disclosure. In the example shown in FIG. 3, system 300 includes a user device 310, a network 320, a server 330, and a database 335. For purposes of discussion, system 300 will be described using system 200 of FIG. 2, as described above, but system 300 is not intended to be limited thereto. Thus, user device 310 may be implemented using, for example, any of mobile devices 210a, 210b, or 210c of FIG. 2, as described above. Similarly, server 330 and database 335 may be implemented using, for example, server 230 and database 235 of FIG. 2, respectively, as described above.

As shown in FIG. 3, user device 310 may execute a client application 312 including a feed reader 314. In an example, feed reader 314 may be configured to present content including syndicated slideshow content from one or more web feeds via an interface to a user of device 310. In some implementations, client application 312 may be a web browser and feed reader 314 may be an integrated component or plugin module of the web browser. Alternatively, client application 312 and feed reader 314 may be implemented as a single dedicated application program for presenting web feeds to which the user of device 310 has subscribed.

In an embodiment, an XML Schema Definition (XSD) 318 stored in a memory 316 of user device 310 may be used to configure feed reader 314 to process web feeds including syndicated slideshow content. While XSD 318 is shown separately from feed reader 314 in FIG. 3, it should be noted that in some implementations, XSD 318 might be integrated with feed reader 314 and/or client application 312. In an example, XSD 318 may be used to extend the RSS feed specification to support slideshow content. Such a slideshow extension thus may be used to enhance the standard RSS format to include slideshow content, such that feed reader 314 can recreate slideshow content along with other supported types of content from the originating web page or article.

In an embodiment, an XSD 334 may be used by a feed generator 332 of server 330 to generate web feeds conforming to the schema definition for the slideshow extension described above (e.g., XSD 318). Thus, a web feed including slideshow content may be generated by feed generator 332 of server 330 and transmitted to feed reader 314 at user device 310 via network 320. Network 320 can be any network or combination of networks that can carry data communication. Network 320 may be implemented using, for example, network 220 of FIG. 2, as described above. In an example, XSD 334 and XSD 318 may provide the same schema definition for processing web feeds including slideshow content. In a further example, XSD 318 stored at user device 310 may be a copy of XSD 334 downloaded from server 330 via network 320. In some implementations, XSD 334 may be a publicly available schema definition file that is made accessible to different client and server devices via network 320 by a web service hosted at server 330 or content delivery network system with which server 330 is associated. Accordingly, XSD 334 and XSD 318 provide matching schema definitions such that feed reader 314 is able to correctly process and reproduce the slideshow content (and other content) included within the feed generated by feed generator 332. In some implementations, XSD 334 may be integrated with feed generator 332. Alternatively, XSD 334 may be stored within database 335 or a local memory accessible to server 330. In some implementations, XSD 318 may be stored within memory 316 after being downloaded from server 330 to user device 310 via network 320.

An exemplary syntax that may be used for defining a complexType element named "RssSlideshow" within XSD 318 and XSD 334 is provided below:

```
<complexType name="RssSlideshow">
  <sequence>
    <choice minOccurs="0" maxOccurs="unbounded">
      <group ref="dc:elementsGroup">
        <xs:annotation>
          <xs:documentation>dublin core metadata for
          slideshow</xs:documentation>
        </xs:annotation>
      </group>
      <element ref="ss:tag" minOccurs="0" maxOccurs="unbounded">
        <xs:annotation>
          <xs:documentation>tags associated with the
          slideshow</xs:documentation>
        </xs:annotation>
      </element>
      <element ref="ss:link">
```

-continued

```
        <xs:annotation>
          <xs:documentation>url associated with the
          slideshow</xs:documentation>
        </xs:annotation>
      </element>
      <element ref="ss:data">
        <xs:annotation>
          <xs:documentation>data placeholder for
          slideshow</xs:documentation>
        </xs:annotation>
      </element>
      <element ref="ss:publishDate">
        <xs:annotation>
          <xs:documentation>publish Date for the the
          slideshow</xs:documentation>
        </xs:annotation>
      </element>
      <element ref="ss:slide" minOccurs="1"
      maxOccurs="unbounded">
        <xs:annotation>
          <xs:documentation>slides belonging to this
          slideshow</xs:documentation>
        </xs:annotation>
      </element>
    </choice>
  </sequence>
</complexType>
```

As shown above, the RssSlideshow complex type element may include a number of component elements for defining attributes or properties associated with a particular slideshow to be syndicated as part of a content or web feed. Examples of such properties include, but are not limited to, any Dublin Core metadata associated with the slideshow, any number of tags (denoted by "<ss:tag>"), a URL of the slideshow (denoted by "<ss:link>"), a placeholder for any additional data that may be associated with the slideshow (denoted by "<ss:data>"), a publication or publish date (denoted by "<ss:publishDate>"), and properties for each slide (denoted by "<ss:slide>"). In addition to the above syntax for defining the RssSlideshow element, embodiments of the present disclosure may include additional elements for defining other relevant properties of the slideshow and each slide included within the slideshow. Examples of such other properties include, but are not limited to, a title, description, attribution information, and type of slide or slideshow (e.g., text, media, etc.).

In an embodiment, feed reader 314 may provide an interface for a user of device 310 to request content from a content or web feed to which the user has subscribed. Feed reader 314 may be configured to obtain data for such a content feed in response to the user-initiated request. In an example, feed reader 314 may initiate its own request (e.g., a request to "pull" data) related to the particular feed, which may be sent to server 330 via network 320. Once the data is obtained by feed reader 314 from server 330 (e.g., from feed generator 332) in response to the request, feed reader 314 may identify a slideshow included within the originating web page based on the obtained data and the schema definition for syndication of slideshow content within XSD 318.

In an embodiment, feed reader 314 may extract from the obtained feed data a first set of properties for the slideshow, e.g., based on XSD 318. The first set of properties may include additional information related to the slideshow including, for example, different metadata fields and values associated with the slideshow. Examples of such metadata may include, but are not limited, one or more keyword tags associated with the slideshow, a title and publication date of the slideshow, copyright or attribution information for the slideshow, a network location (e.g., URL) or identifier (e.g., URI) corresponding to an originating source or location of the slideshow content. Further examples of such metadata may include any number of standard metadata fields used generally for content within a feed including, for example, Dublin Core metadata fields.

Further, feed reader 314 may use the first set of properties extracted from the data to identify a set of slides for the slideshow. Like the slideshow, pertinent information may be associated with each slide of the slideshow. An exemplary syntax that may be used for defining a complexType element named "RssSlide" within XSD 318 and XSD 334 is provided below:

```
<complexType name="RssSlide">
  <sequence>
    <choice maxOccurs="unbounded">
      <element ref="ss:slideType">
        <xs:annotation>
          <xs:documentation>indicate the slide
          type</xs:documentation>
        </xs:annotation>
      </element>
      <group ref="dc:elementsGroup">
        <xs:annotation>
          <xs:documentation>any dublin core metadata for
          slide</xs:documentation>
        </xs:annotation>
      </group>
      <element ref="ss:tag" minOccurs="0" maxOccurs="unbounded">
        <xs:annotation>
          <xs:documentation>tags associated with the
          slide</xs:documentation>
        </xs:annotation>
      </element>
      <element ref="ss:link">
        <xs:annotation>
          <xs:documentation>url associated with the
          slide</xs:documentation>
        </xs:annotation>
      </element>
      <element ref="media:group">
        <xs:annotation>
          <xs:documentation>media group attributes of the
          slide</xs:documentation>
        </xs:annotation>
      </element>
      <element ref="media:content">
        <xs:annotation>
          <xs:documentation>media attributes of the
          slide</xs:documentation>
        </xs:annotation>
      </element>
      <element ref="ss:data">
        <xs:annotation>
          <xs:documentation>data placeholder for the
          slide</xs:documentation>
        </xs:annotation>
      </element>
      <element ref="ss:publishDate">
        <xs:annotation>
          <xs:documentation>publish Date for the the
          slide</xs:documentation>
        </xs:annotation>
      </element>
    </choice>
  </sequence>
</complexType>
```

As shown above, the RssSlide complex type element may include a number of component elements for defining attributes or properties associated with a particular slide within the slideshow to be syndicated as part of a content or web feed. Examples of such properties include, but are not limited to, a slide type, for example, image, video, text, or message stream (denoted by "<ss:slideType>"), any Dublin Core metadata associated with the slideshow, any number of tags (denoted by "<ss:tag>"), a URL of the slideshow (denoted by "<ss:link>"), any media group attributes associated with the slide (denoted by "<media:group>"), any media attributes associated with the slide or the contents thereof (denoted by "<media:content>"), a placeholder for any additional data that may be associated with the slide (denoted by "<ss:data>"), and a publication or publish date (denoted by "<ss:publishDate>") associated with the slide. Like the RssSlideshow element described above, embodiments of the present disclosure may include any of various other elements in addition to the RssSlide element that may be used to define any number of additional properties that may be relevant to one or more slides included within a slideshow to be syndicated. Examples of such other properties include, but are not limited to, a title, description, and attribution information for each slide.

Accordingly, feed reader 314 may extract, from the obtained data, a second set of properties for each slide in the identified set. The second set of properties may be extracted based on the schema definition within XSD 318, as described above. The second set of properties may include metadata associated with each slide including, but not limited to, a slide type (e.g., image, video, text, etc.), a publication date, a network location (or URL/URI) of the slide, attribution information for the slide, and any standard metadata fields generally associated with the type of feed data or content of the slide (e.g., any Dublin Core metadata and/or any Media RSS metadata associated with a slide). In some implementations, the slide type may be associated with a third-party social networking or messaging service, e.g., which may provide message streams enabling users to share or post content with other users of the service.

In an embodiment, feed reader 314 uses the first and second set of properties extracted for the slideshow and each slide, respectively, to provide the content/web feed (or a representation thereof) including the set of slides of the slideshow to be presented to the user via an interface of feed reader 314.

Figure 4:
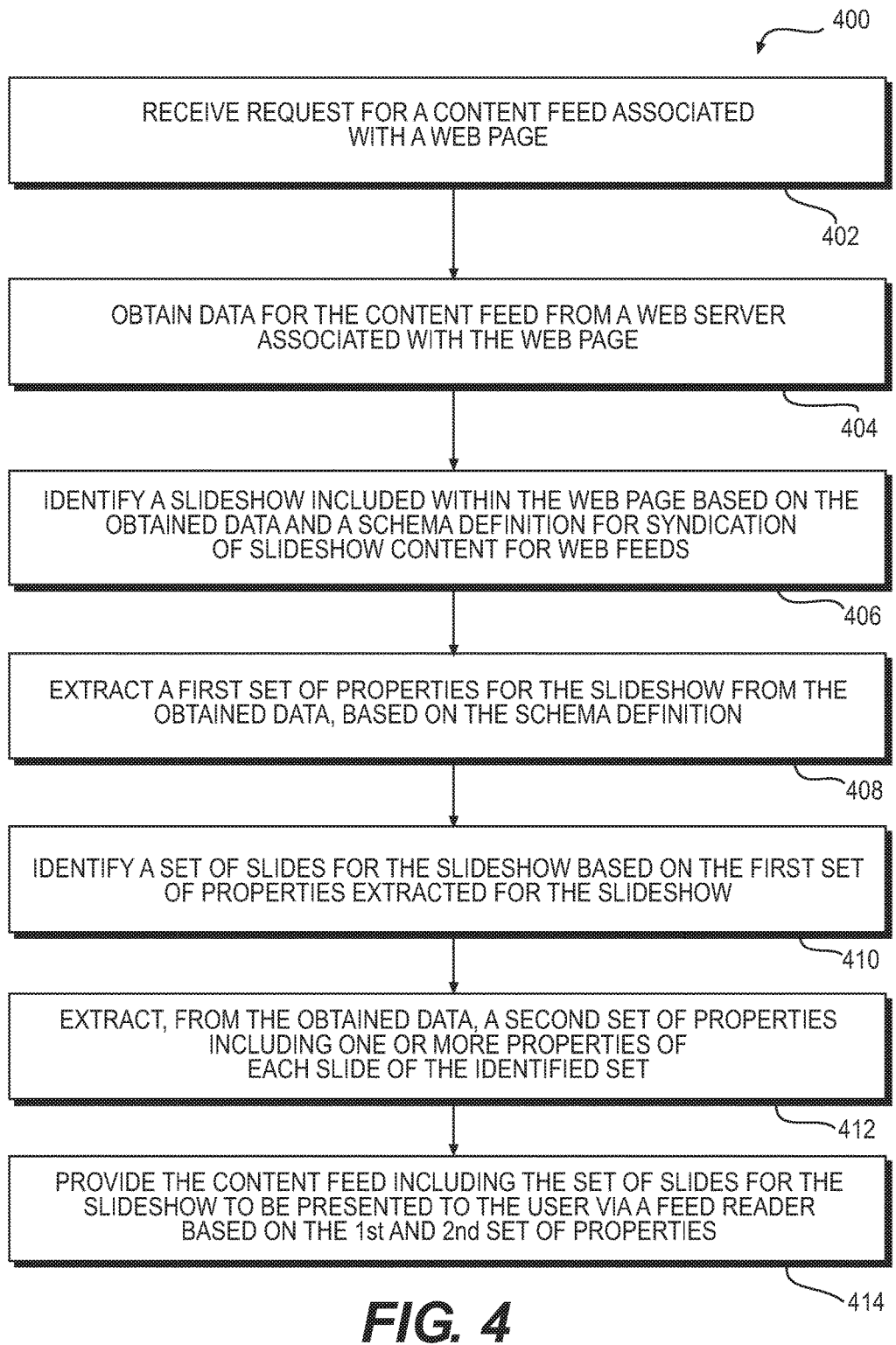
FIG. 4 is a process flowchart of an exemplary method for providing syndicated slideshow content from a web feed to a user of a feed reader.

FIG. 4 is a process flowchart of an exemplary method 400 for syndicating slideshow content of a web page for a content or web feed or channel accessible via a feed reader. Method 400 may include steps 402, 404, 406, 408, 410, 412, and 414. For purposes of discussion, method 400 will be described using system 300 of FIG. 3, as described above. However, method 400 is not intended to be limited thereto. In an example, the steps of method 400 may be implemented within feed reader 314 of user device 310 of FIG. 3.

Method 400 begins in step 402, which includes receiving a user's request for a content feed associated with a web page. In step 404, data is obtained for the content feed from a web server (e.g., server 330 of FIG. 3, as described above) associated with the web page. In step 406, a slideshow included within the web page is identified based on the obtained data and a schema definition (e.g., XSD 318 of FIG. 3) for syndication of slideshow content within web pages. Step 408 includes extracting a first set of properties for the identified slideshow, based on the schema definition. As described above, the properties of the first set of properties may include, but are not limited to, one or more keyword tags or identifiers associated with the slideshow, a publication date of the slideshow, a network location of or link to the content of the slideshow (e.g., in the form of a URL of a web page or URI of any type of resource accessible via the network), one or more Dublin Core metadata properties, and one or more media RSS metadata properties.

The extracted set of properties may be used to identify a set of slides for the slideshow in step 410. In step 412, a second set of properties is extracted from the obtained data for each slide in the identified set. The second set of properties may include, for example, one or more properties of each slide of the identified set. As described above, the second set of properties may include various metadata associated with each slide including, but not limited to, one or more keyword tags associated with each slide, any additional data (e.g., a title or description) associated with the slide, attribution information, a publication date, a slide type (e.g., an image, video, text, or message stream, such as that provided by or associated with a third-party messaging service provider) and any standard metadata fields for RSS feeds (e.g., Dublin Core metadata properties and/or media RSS metadata properties).

Method 400 then proceeds to step 414, which includes providing the content feed including the set of slides for the slideshow based on one or more of the properties of the extracted first set of properties and the properties of the second set of properties extracted for the slideshow and each slide, respectively. The content feed or a representation thereof may be presented to the user via, for example, a GUI of the feed reader (e.g., feed reader 314 of FIG. 3) executable at the user's computing device (e.g., user device 310 of FIG. 3).

Figure 5:
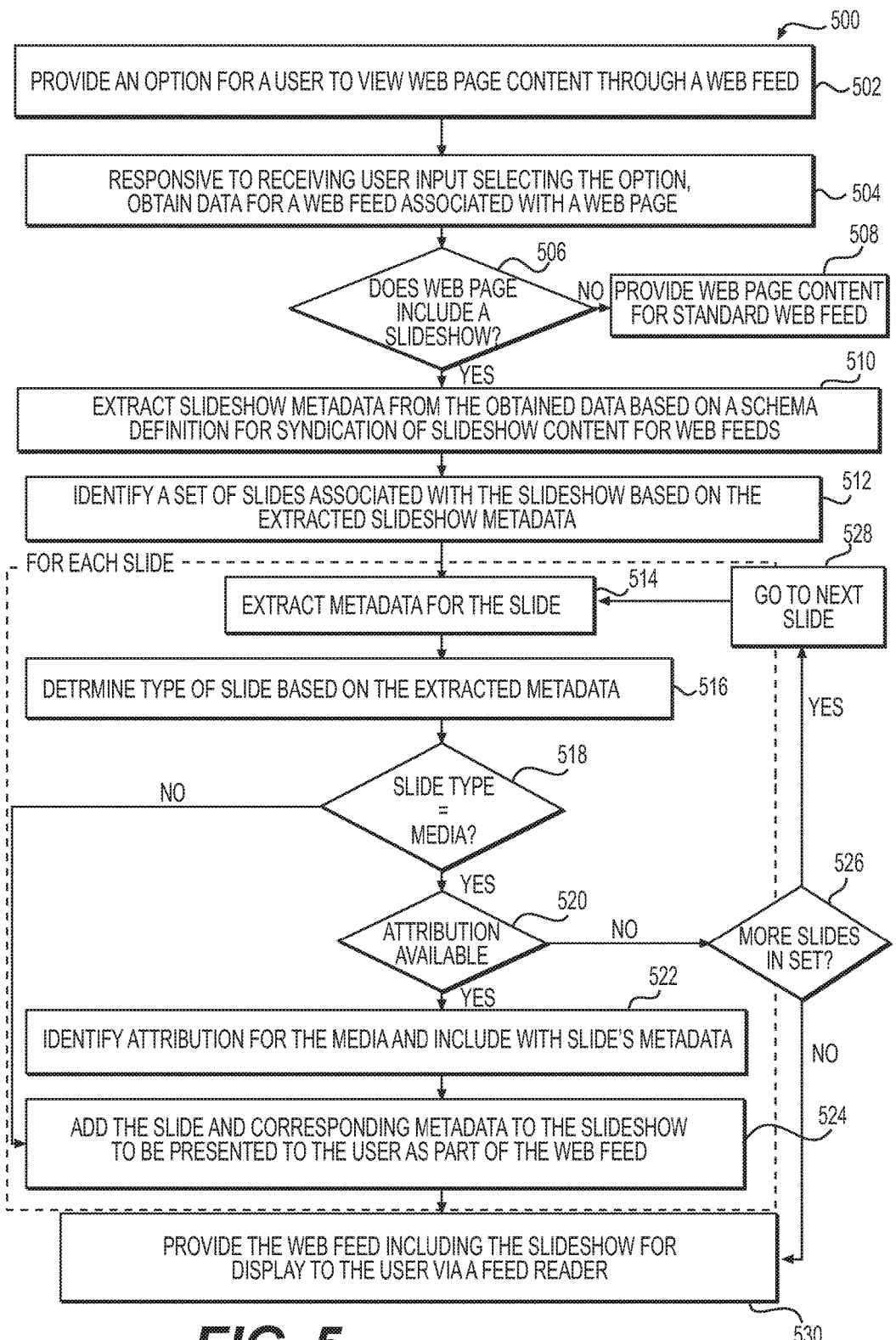
FIG. 5 is a process flowchart of another exemplary method for providing syndicated slideshow content from a web feed to a user of a feed reader.

FIG. 5 is a process flowchart of an exemplary method 500 for syndicating slideshow content of a web page for a content or web feed or channel accessible via a feed reader. Method 500 may include steps 502, 504, 506, 508, 510, 512, 514, 516, 518, 520, 522, 524, 526, 528, and 530. For purposes of discussion, method 500 will be described using system 300 of FIG. 3, as described above. However, method 500 is not intended to be limited thereto. In an example, the steps of method 500 may be implemented within feed reader 314 of user device 310 of FIG. 3.

Method 500 may begin in step 502, which may include providing a feed option for viewing web page content via a content feed reader. Upon receiving user input indicating that the option is selected in step 504, data for a content feed associated with the web page may be obtained. In step 506, a determination may be made as to whether the web page includes a slideshow. If a slideshow is included, slideshow metadata may be extracted in step 510 from the obtained content feed data using a schema definition (e.g., XSD 318 of FIG. 3) for syndication of slideshow content of web pages. Otherwise, the method concludes in step 508, in which the web page's content may be provided to the user as a standard web feed, e.g., which may be displayed to the user via an interface of the content feed reader executable at the user's device.

After step 510, method 500 proceeds to step 512, which includes identifying a set of slides associated with the slideshow based on the extracted slideshow metadata. Next, steps 514, 516, 518, 520, 522, and 524 may be performed for each slide. In step 514, metadata is extracted for each slide as it is processed. A type of slide may be determined in step 516, based on the extracted metadata. If the slide type for a slide is determined to be a type of media (e.g., one or more images and/or video), method 500 may proceed to step 520, which includes determining whether attribution information is available for the slide (or media included therein). If attribution information is available, method 500 may proceed to steps 522 and 524, which include identifying attribution information for the media content, including the identified attribution with the metadata associated with the slide, and adding the slide and corresponding metadata to the slideshow to be presented to the user as part of the web feed. Otherwise, method 500 proceeds to steps 526 and 528 for repeating the above-described steps for the next slide in the set that is yet to be processed. However, it should be noted that in other embodiments, media slides may be added to the slideshow regardless of whether or not attribution information is available for these slides. Method 500 concludes in step 530, which includes providing the content feed for the web page including the slides added for the slideshow presentation via the content feed reader.

The examples described above with respect to FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 6:
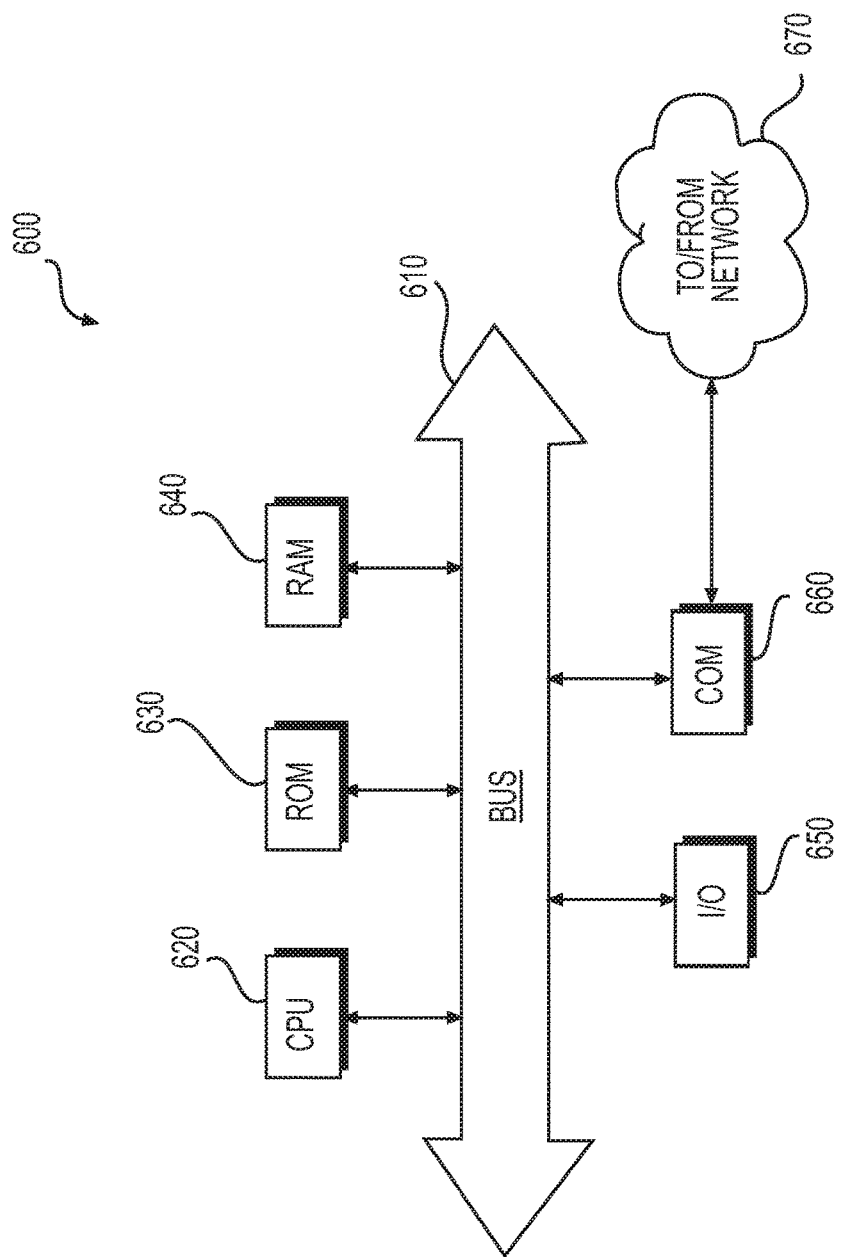
FIG. 6 is a block diagram of an exemplary computer system in which embodiments of the present disclosure may be implemented.

FIG. 6 illustrates a high-level functional block diagram of an exemplary computer system 600, in which embodiments of the present disclosure, or portions thereof, may be implemented, e.g., as computer-readable code. For example, systems 200 and 300 of FIGS. 2 and 3, respectively, can be implemented in computer system 600 using hardware, software, firmware, tangible computer readable media having instructions stored thereon, or a combination thereof and may be implemented in one or more computer systems or other processing systems. Hardware, software, or any combination of such may embody any of the modules and components in FIGS. 2 and 3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-5 may be implemented using computer system 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 6, computer system 600 includes a central processing unit (CPU) 620. CPU 620 may be any type of processor device including, for example, any type of special purpose or a general purpose microprocessor device. As will be appreciated by persons skilled in the relevant art, CPU 620 also may be a single processor in a multi-core/multiprocessor system, such system operating alone, or in a cluster of computing devices operating in a cluster or server farm. CPU 620 is connected to a data communication infrastructure 610, for example, a bus, message queue, network, or multi-core message-passing scheme.

Computer system 600 also includes a main memory 640, for example, random access memory (RAM), and may also include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into computer system 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 600.

Computer system 600 may also include a communications interface ("COM") 660. Communications interface 660 allows software and data to be transferred between computer system 600 and external devices. Communications interface 660 may include a modem, a network interface (such as an Ethernet card), a communications port, a PCM-CIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of computer system 600, which may be implemented using, for example, wire or cable, fiber optics, a phone line, a cellular phone link, an RF link or other communications channels. Further, communications interface 660 may be configured to send and receive to and from other computing devices through a network 670 (e.g., network 220 of FIG. 2 or network 320 of FIG. 3, as described above). Network 670 may be any type of electronic network or combination of networks used for exchanging electronic information between various computing devices. Network 670 may include, for example, a local area network, a medium area network, or a wide area network, such as the Internet.

The hardware elements, operating systems and programming languages of such equipment are conventional in nature, and it is presumed that those skilled in the art are adequately familiar therewith. Computer system 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, this disclosure is not to be considered as limited by the foregoing description.

The breadth and scope of the present disclosure should not be limited by any of the above-described exemplary embodiments, but should be defined only in accordance with the following claims and their equivalents.

What is claimed is:

1. A computer-implemented method for syndicating slideshow content in a web feed, the method comprising:

receiving, at a server, a request initiated from a feed reader for slideshow content, wherein the feed reader is executable at a user device, and wherein a first XML Schema Definition ("XSD") stored on the user device enables the feed reader to process slideshow content conforming to XSD;

generating, by a feed generator at the server, data for a content feed associated with a web page in response to the request, wherein a second XSD stored on the server enables the feed generator to generate the data conforming to XSD;

sending, from the server, the generated data to the feed reader in response to the request;

identifying, by the feed reader, a slideshow included within the web page based on analysis of the generated data according to the first XSD;

extracting, by the feed reader, a first set of properties for the identified slideshow content, from the generated data, based on the first XSD;

identifying a set of slides of the slideshow based on the first set of properties extracted for the identified slideshow;

extracting a first message stream slide type and a second message stream slide type of each of one or more slides in the identified set of slides, wherein the first message stream slide type and the second message stream slide type includes at least one of an image, video, and text; and displaying, at the feed reader of the user device, the content feed including the set of slides of the slideshow along with the first set of properties, a first message stream of the first message stream slide type, and a second message stream of the second message stream slide type.

2. The method of claim 1, wherein the first set of properties includes one or more keyword tags associated with the slideshow.

3. The method of claim 1, wherein the first set of properties includes a publication date of the slideshow.

4. The method of claim 1, wherein the content feed is a Really Simple Syndication (RSS) feed.

5. The method of claim 1, wherein the first set of properties includes one or more of Dublin Core and media RSS metadata properties.

6. The method of claim 1, wherein the first set of properties includes a universal resource locator (URL) or a universal resource identifier (URI) corresponding to the slideshow.

7. The method of claim 1, wherein the first set of properties includes one or more keyword tags associated with one or more slides in the identified set of slides.

8. The method of claim 1, wherein the first set of properties includes a publication date of one or more slides in the identified set of slides.

9. The method of claim 1, wherein the message stream slide type includes a messaging service.

10. A system for syndicating slideshow content in a web feed, the system comprising:

a memory having processor-readable instructions stored therein; and a processor configured to access the memory and execute the processor-readable instructions, which when executed by the processor configures the processor to perform a plurality of functions, including functions to:

receive, at a server, a request initiated from a feed reader for slideshow content, wherein the feed reader is executable at a user device, and wherein a first XML Schema Definition ("XSD") stored on the user device enables the feed reader to process slideshow content conforming to XSD;

generate, by a feed generator at the server, data for a content feed associated with a web page in response to the request, wherein a second XSD stored on the server enables the feed generator to generate the data conforming to XSD;

send, from the server, the generated data to the feed reader in response to the request;

identify, by the feed reader, a slideshow included within the web page based on analysis of the generated data according to the first XSD;

extract, by the feed reader, a first set of properties for the identified slideshow content, from the generated data, based on the first XSD;

identify a set of slides of the slideshow based on the first set of properties extracted for the slideshow;

extract, a first message stream slide type and a second message stream slide type of each of one or more slides in the identified set of slides, wherein the first message stream slide type and the second message stream slide type includes at least one of an image, video, and text; and display, at the feed reader of the user device, the content feed including the set of slides of the slideshow along with the first set of properties, a first message stream of the first message stream slide type, and a second message stream of the second message stream slide type.

11. The system of claim 10, wherein the first set of properties includes one or more keyword tags associated with the slideshow.

12. The system of claim 10, wherein the first set of properties includes a publish date of the slideshow.

13. The system of claim 10, wherein the content feed is a Really Simple Syndication (RSS) feed.

14. The system of claim 10, wherein the first set of properties includes one or more of Dublin Core and media RSS metadata properties.

15. The system of claim 10, wherein the first set of properties includes a universal resource locator (URL) or a universal resource identifier (URI).

16. The system of claim 10, wherein the first set of properties includes one or more keyword tags and a publication date.

17. A non-transitory computer-readable medium storing instructions that, when executed by a computer, cause the computer to perform functions to:

receive, at a server, a request initiated from a feed reader for slideshow content, wherein the feed reader is executable at a user device, and wherein a first XML Schema Definition ("XSD") stored on the user device enables the feed reader to process slideshow content conforming to XSD;

generate, by a feed generator at the server, data for a content feed associated with a web page in response to the request, wherein a second XSD stored on the server enables the feed generator to generate the data conforming to XSD;

send, from the server, the generated data to the feed reader in response to the request;

identify, by the feed reader, a slideshow included within the web page based on analysis of the generated data according to the first XSD;

extract, by the feed reader, a first set of properties for the identified slideshow content, from the generated data, based on the first XSD;

identify a set of slides of the slideshow based on the first set of properties extracted for the slideshow;

extract, a first message stream slide type and a second message stream slide type of each of one or more slides in the identified set of slides, wherein the first message stream slide type and the second message stream slide type includes at least one of an image, video, and text; and display, at the feed reader of the user device, the content feed including the set of slides of the slideshow along with the first set of properties, a first message stream of the first message stream slide type, and a second message stream of the second message stream slide type.

* * * * *